Sept. 3, 1968     L. A. McNABB     3,400,243
ELECTRON BEAM WELDING MACHINE
Filed Aug. 10, 1964     4 Sheets-Sheet 1
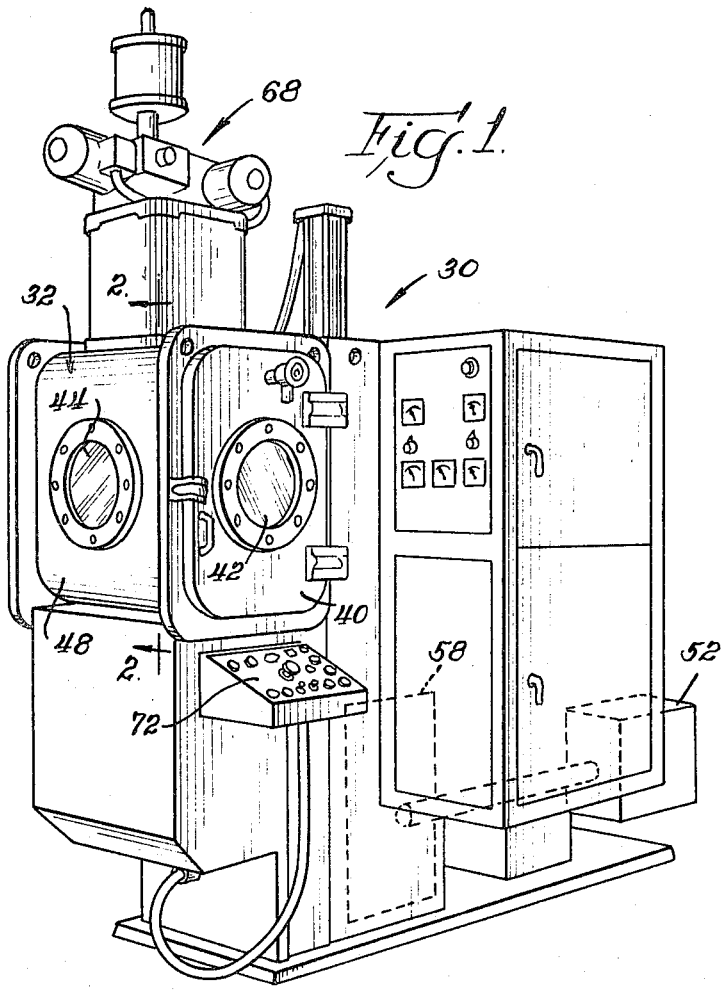
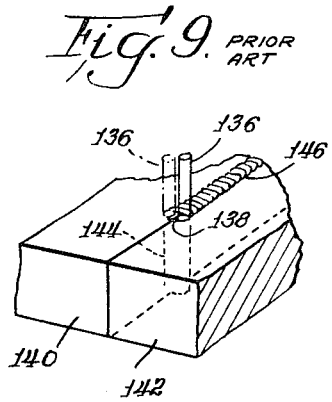
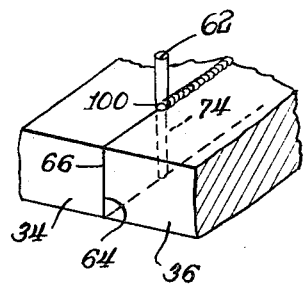
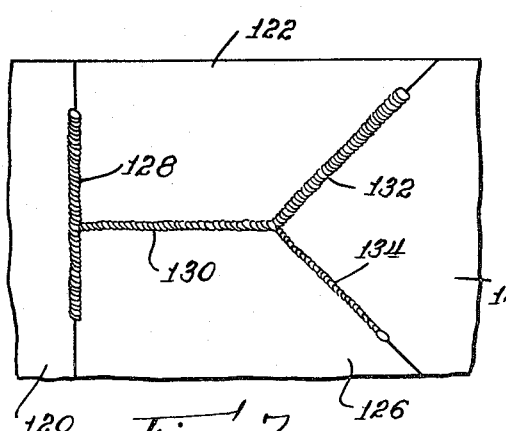
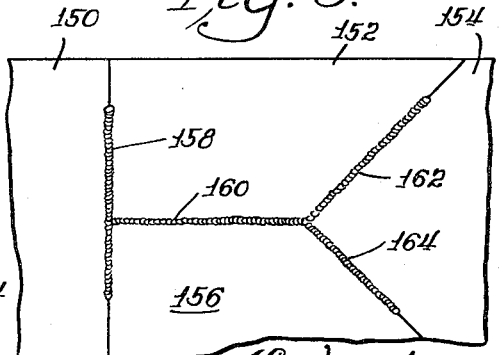
Inventor
Louis A. McNabb
By: Olson, Trexler
Wolters & Bushnell   Attys.

Inventor
Louis A. McNabb
By: Olson, Trexler,
Wolters & Bushnell Attys.

Sept. 3, 1968        L. A. McNABB        3,400,243
ELECTRON BEAM WELDING MACHINE
Filed Aug. 10, 1964        4 Sheets-Sheet 3
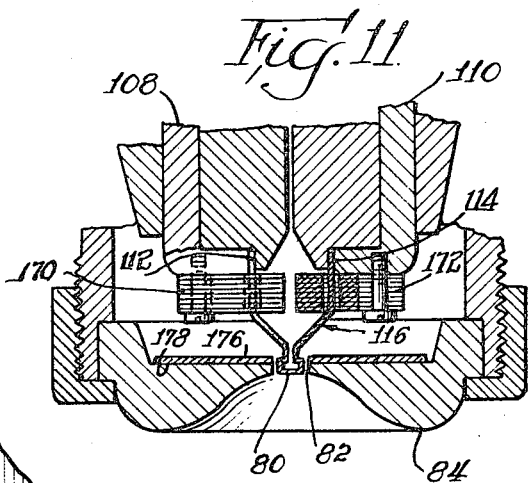
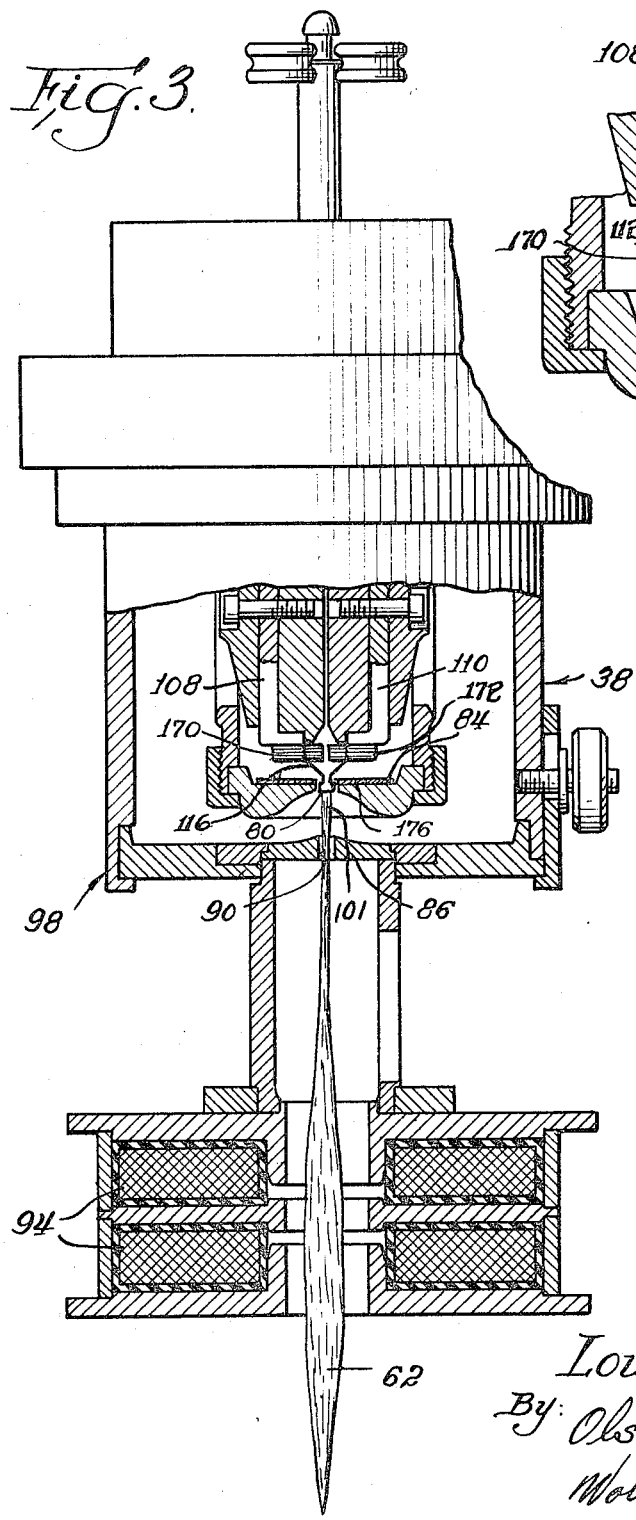
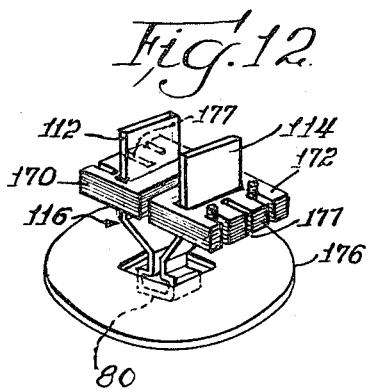
Inventor
Louis A. McNabb
By: Olson, Trexler,
Wolters & Bushnell Attys.

Sept. 3, 1968 L. A. McNABB 3,400,243
ELECTRON BEAM WELDING MACHINE
Filed Aug. 10, 1964 4 Sheets-Sheet 4
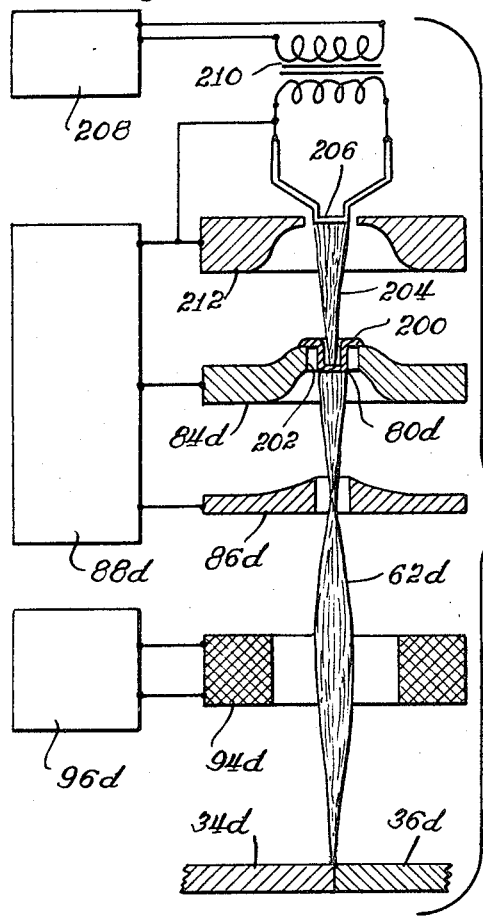
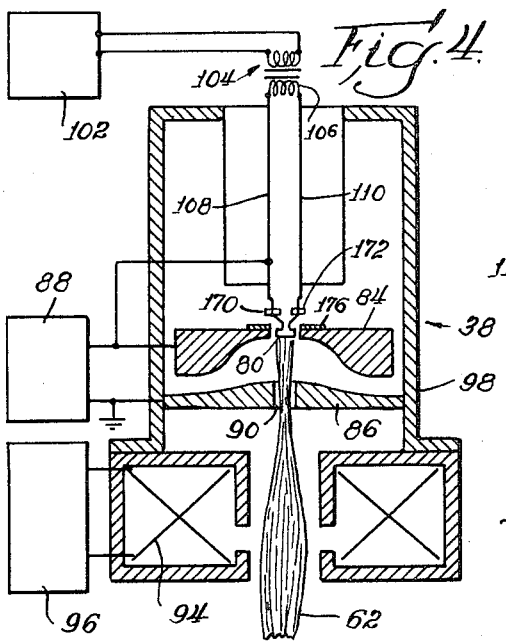
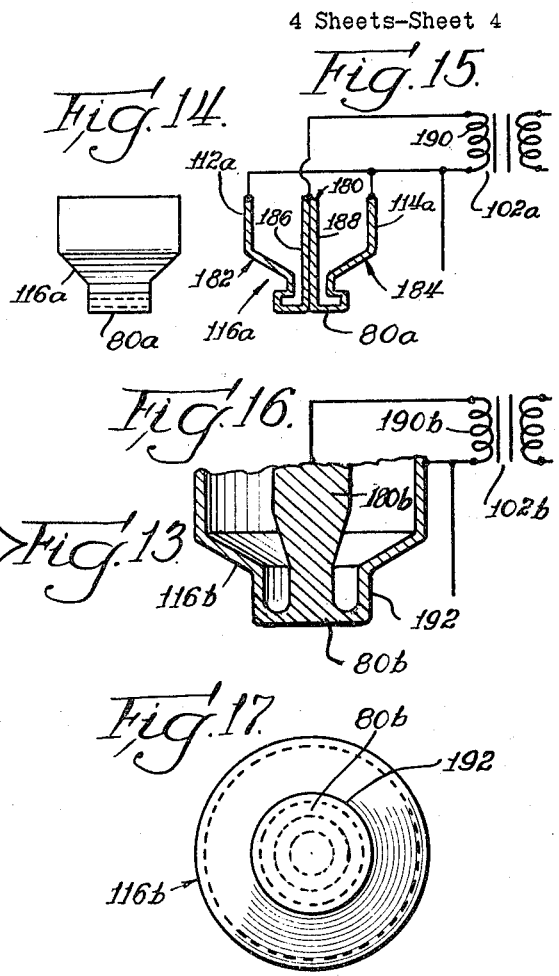
Inventor
Louis A. McNabb
By: Olsen, Trexler
Wolters & Bushnell
Att'ys.

3,400,243
ELECTRON BEAM WELDING MACHINE
Louis A. McNabb, Glen Ellyn, Ill., assignor to Mech-Tronics Corporation, Melrose Park, Ill., a corporation of Illinois
Filed Aug. 10, 1964, Ser. No. 388,480
7 Claims. (Cl. 219—121)

ABSTRACT OF THE DISCLOSURE

A high precision beam welding machine in which a welding beam of electrons emitted by an electrically heated emitter is focused onto a workpiece with great precision by virtue of the path of the beam being rendered effectively free of beam deflecting magnetomotive influences incident to electrical heating of the emitter. This end is advantageously achieved by most economical structural expedients which harmlessly collect and effectively isolate from the beam path or which work an effective self-neutralization of the magnetomotive influences incident to emitter heating current. In conjunction with these most economical and effective expedients or as an alternative, the emitter is heated electrically by electron bombardment, thus effectively avoiding generation beam deflecting magnetomotive forces incident to electrical heating of the emitter.

---

The present invention relates to beam welders which include a vacuum chamber wherein the welding of parts or workpieces is performed by localized heating to fusion temperatures of abutting interfaces and immediately adjacent structure of the parts. In such beam welders, localized heating of abutting parts to be welded is effected by directing a focused beam or stream of high velocity electrons into a thin welding zone wherein the electrons collide with and heat to fusion temperatures thin portions of the respective parts defining the confronting interfaces between the parts along which the desired weld is formed. For convenience in expression, the welding of parts in this manner will be referred to as "beam welding."

Beam welding of parts offers many inherent advantages. As a matter of fact, beam welding has proven to be a very satisfactory technique for fusing together parts that cannot be acceptably joined in any other way, thus making beam welding and beam welding machines a unique answer to the problem of joining together parts to meet specifications that cannot be acceptably met by any other practical technique of welding or otherwise securing parts together. Indeed, it is only on account of the very great advantages and unique capabilities of beam welding that the very high cost, running into many tens of thousands of dollars, of commercial beam welding machines is justified.

Characteristically, conventional beam welding machines have imposed on the users of such machines a very heavy economic burden which has tended to make beam welding prohibitively expensive except in the fabrication of structures having sufficient value to justify the cost of beam welding. As will appear, the high economic cost of beam welding is somewhat paradoxical when viewed in relation to the strikingly short time, normally only a matter of a few seconds, required to produce from start to finish a very extensive beam weld.

The economic burden that a conventional beam welding machines imposes on the user of such a machine stems not only from the very high first cost of the machine, but also from other factors including two principal ones that are, among other things, the concern of this invention.

The unit cost of beam welding parts by a user who has made the high initial investment to purchase and house a conventional beam welding machine is kept very high because of the very limited productivity that can be realized as a practical matter from a conventional beam welder, and because of the necessity of providing the services of a highly educated and knowledgeable individual in order to set up the machine properly to perform different welding operations.

The limited productivity of conventional beam welding machines, which contrast sharply with the extremely brief time to produce an individual weld, arises in large measure from the time and effort required to determine the specific operating conditions to use in different welding operations.

The performance of conventional beam welding machines is affected by many variables, some of which can be rather precisely controlled. However, the quality and acceptability of the welds is effected by and to a large extent determined by other variables which are of an uncertain character and which have effects that are different or even impossible to predict with certainty. As a consequence, it is often necessary to run a number of empirical tests in order to determine the exact operating conditions to use in performing a specific welding operation. The parts to be welded are often very expensive. Hence, the pretesting of welding conditions on test pieces to provide reliable data for producing the final desired weld often requires considerable ingenuity and judgment by an expert. Even so, initial success is not always assured. In addition to being the cause of even more serious faults in welds, some of the uncertain variables referred to which effect the operation of conventional beam welding machines cause in the production of many welds an undesirable extension of surface irregularities produced as an incident to welding.

One object of the invention is to provide a new beam welding machine having improved operating characteristics that decidedly increase the practical productivity of the machine and at the same time improve the quality of the welds produced by the improved machine as compared to the quality of the welds produced by conventional beam welding machines.

Another object of the invention is to provide a new and improved beam welding machine having performance characteristics that are predictable with a practical certainty that can be relied upon in determining the operating conditions for performing different welding operations. A related object is to provide a beam welding machine having improved operational characteristics that radically minimize the effort and judgment needed to determine the operating conditions required for performing different welding operations.

Another object is to provide an improved beam welding machine having improved operating characteristics that increase the welding efficiency of the machine and improve the quality of the welds made by the machine. A related object is to provide an improved beam welding machine having operational characteristics that are improved in relation to the operational characteristics of conventional beam welding machines to the end that in producing any particular weld the volume of material heated to fusion temperature at any one time by the improved machine is substantially reduced and there is assurance that the width of the material, transverse to the length of the weld, that is heated to fusion temperature is minimized.

Another object is to provide a beam welding machine that is improved in such a way that the welding beam of electrons bombards a surface area of the workpieces that has a width, measured transversely with respect to the direction of movement of the workpieces relative to the beam, that is the same for all directions of movement of the workpieces with respect to the beam and that is minimizing to a desired optimum value for most efficient welding.

A more specific object is to provide an improved beam welder that operates to direct a powerful welding stream of electrons against workpieces in a very thin beam that is not deflected either statically or dynamically by operation of the means that heats the emitter forming the source of the electrons in the beam.

A further object is to provide an improved beam welder adapted to be manufactured at a cost that is not significantly higher than the cost of a conventional beam welder and which utilizes alternating current to directly heat the emitter of the electrons in the beam, to achieve the advantages that can be derived from direct heating of the emitter by alternating current, and which at the same time concentrates the welding stream of electrons in a thin beam that remains steady and undeflected by the alternating current that heats the emitter.

Another object is to provide an improved beam welding machine which has, as compared to conventional beam welding machines, an increased depth of focus that makes setting up the machine to produce a weld easier and less critical and that makes control of the machine much simpler and easier while at the same time contributing materially to the production of welds of improved quality.

Another object is to provide, substantially at the cost of a conventional beam welding machine, an improved beam welding machine of the character recited in the preceding object which produces with increased dependability welds of improved quality by means of an improved mode of operation that lowers the cost of beam welding sharply, thus making the inherent advantages of beam welding available in the fabrication of structures for which beam welding could not previously be economically justified.

Other objects and advantages will become apparent from the following description of the exemplary embodiment of the invention illustrated in the drawings, in which:

FIGURE 1 is a perspective view of a beam welding machine embodying the invention;

FIG. 3 is a side view, on an enlarged scale, somewhat simplified and sectioned longitudinally, of the welding beam producing assembly incorporated in the welding chamber shown in FIG. 2;

FIG. 4 is a simplified schematic cross-sectional illustration of the welding beam assembly of FIG. 3 together with a diagrammatic illustration of coacting power supply means;

FIG. 7 is a plan view of workpieces welded together by a conventional beam welding machine and illustrating the variation in width of the weld beads for different directions of weld produced by a conventional beam welding machine;

FIG. 8 is a plan view similar to FIG. 7 but showing workpieces as welded together by the beam welding machine embodying the invention, the figure illustrating the uniform width of the beads of welds extending in different directions;

FIG. 9 is a fragmentary perspective view of two workpieces being welded by a conventional beam welding machine, illustrating one effect on the welding operation of the dynamic deflection of the welding beam;

FIG. 10 is a perspective view similar to FIG. 9 but showing workpieces being welded by the machine embodying the invention;

FIG. 11 is a fragmentary sectional view of the welding electron emitter zone of the assembly of FIG. 3, but showing the parts on an enlarged scale;

FIG. 12 is a perspective view showing the relationship to the emitter and coacting current supply conductors of parts shown in FIGS. 3 and 11 that function in eliminating dynamic deflection of the welding beam;

FIG. 13 is a simplified illustration of a modified embodiment of the invention, only major electrical components being shown;

FIG. 14 is a side view of emitter structure used in producing a modified embodiment of the invention;

FIG. 15 is a transverse sectional view taken along the line 15—15 of FIG. 14 and illustrating diagrammatically coacting power supply means;

FIG. 16 is a sectional view similar to FIG. 13 but showing a construction used in producing another modified embodiment of the invention;

FIG. 17 is a bottom view of the emitter structure shown in FIG. 16;

FIG. 18 is a front view of structure used in producing another modified embodiment of the invention; and FIG. 19 is a side view of the structure illustrated in FIG. 18.

Figure 2:
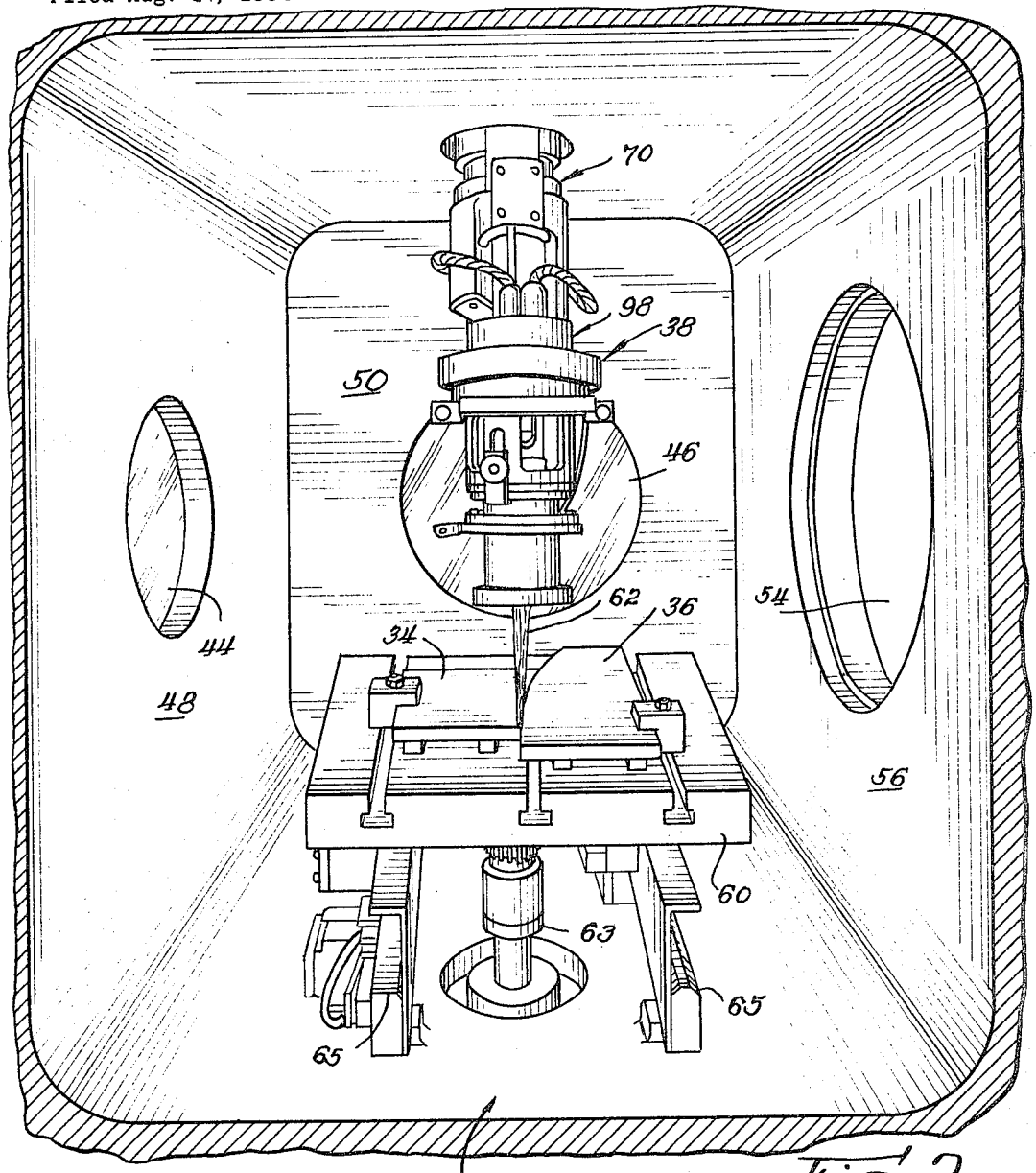
FIG. 2 is a sectional view in perspective and on an enlarged scale taken with reference to the line 2—2 in FIG. 1 and looking into the welding chamber in the machine.

Referring to the drawings in greater detail, the beam welding machine 30 forming the illustrated embodiment of the invention, FIG. 1, comprises a generally rectilinear vacuum chamber 32 designed to contain both the parts or workpieces 34, 36 to be welded and structure 38, FIG. 2, that produces the welding beam of electrons that is employed in the manner to be described to fuse together contiguous portions of the workpieces.

As shown, the vacuum or welding chamber 32 is equipped with a rectangular access door 40 through which parts to be welded together are placed in the chamber for welding and subsequently removed. The welding operation performed in the chamber 32 can be viewed through circular transparent panels 42, 44 and 46 in the door 40 and sides 48, 50 of the chamber, FIGS. 1 and 2.

After the parts to be welded are placed in the chamber 32 and set up for welding, the chamber 32 is evacuated to remove virtually all the air in the chamber, the degree of evacuation produced in the chamber being of the same character as that produced in an electronic vacuum tube, even though the chamber 32 has a volume of many cubic feet, this volume being necessary to accommodate workpieces of the size which the machine is intended to accept, together with the equipment that must be housed in the chamber.

To minimize the nonproductive, dead time required to evacuate the welding chamber 32, the machine 30 is equipped with powerful and high capacity air evacuating pumps. Most of the air is removed from the vacuum chamber 32 by a "roughing" vacuum pump 52, FIG. 1, lowering the pressure within the chamber to a very low level, whereupon a large valve 54, FIG. 2, in the side 56 of the chamber 32 opens to connect the chamber with a diffusion pump 58, FIG. 1, that completes evacuation of the chamber. Even though the pumps are powerful, several minutes are still required to evacuate the chamber 32 for welding. The chamber structure and the pumps and controls used to evacuate the chamber structure are well known in the art but, nevertheless, expensive.

In the chamber 32, the typical workpieces 34, 36 are mounted on a work holder 60, FIG. 2, generally in underlying relation, as illustrated, to the welding beam producing structure or assembly 38 that directs a welding stream of electrons against the workpieces.

Figure 5:
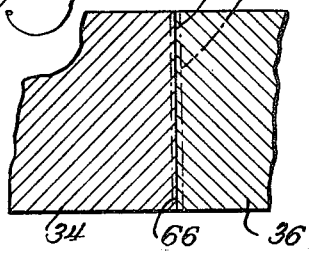
FIG. 5 is a fragmentary sectional view taken transversely through the interface between typical workpieces abutted together in readiness for beam welding in the machine.
Figure 6:
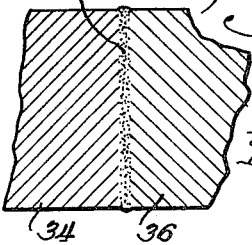
FIG. 6 is a view similar to FIG. 5 but showing the parts fused together by the thin beam weld produced by operation of the machine.

The welding stream or beam 62 of electrons issuing from the assembly 38 is caused to move along the abutting interfaces, 64, 66 of the workpieces to be fused together, FIGS. 2 and 5, by the production of relative movement between the position of the electron beam 62 and the workpieces that continues progressively during the welding operation.

Relative movement of the workpieces in relation to the position of the electron stream is produced by progressively moving either the work holder 60 or the electron beam producing assembly 38, or both. As shown, FIG. 2, a power drive 64 extending up from the bottom of the chamber 32 operates to translate the work holder 60 along support tracks 66. An upper power drive assembly 68, FIG. 1, operates through eccentric support means 70, FIG. 2, to move progressively the welding beam producing assembly 38. The power drives for the work holder 60 and the assembly 38 are controlled from a control panel 72 on the machine, FIG. 1.

Although the machine 30 is not limited to the production of butt welds, its operation can be best visualized and appreciated in relation to the production of butt welds.

As illustrated in FIGS. 2 and 5, parts or workpieces 34, 36 to be butt welded are mounted on the work holder 60 to produce confronting surface contact between comating surfaces 64, 66 on the respective parts which are to be fused together. Welding of the parts thus supported in opposing contact with each other is effected by heating to fusion temperature the structure of the respective parts immediately adjacent the confronting surfaces or interfaces 64, 66 which are to be fused together.

The material structure of the abutting workpieces 34, 36, in a very thin welding zone 74 centered with respect to the abutting interfaces 64, 66 is heated to fusion temperature by a powerful welding stream of electrons directed against the workpieces in a focused beam 62 as intimated.

One of the merits of beam welding is the capability of beam welding to weld together without distortion even thick heavy parts with welds extending entirely across extensive confronting portions of the parts. Not only is the heat distortion incident to welding virtually eliminated, but the volume of the material structure of the parts which is fused is kept extremely small, all with the result that even extensive and deep welds can be produced with no distortion of the parts and little disturbance of the surface adjacent the weld, provided, however, that the conditions under which the weld is produced are precisely correct.

One of the secrets of success in producing good quality beam welds is in confining the volume of material heated to fusion temperature to the material in a very narrow zone 74, FIG. 5, immediately adjacent the abutting interfaces of the parts. In beam welding, the beam of electrons heats the material in a very thin welding zone to fusion temperature so quickly that the quantity of heat transmitted from the welding zone, where the material is heated to fusion, to the adjacent structure is not sufficient to cause distortion or deleterious heating of the adjacent structure. The beam of electrons, which effects such rapid heating to fusion temperature of the very limited quantity of material in its path in the welding zone, moves progressively along the confronting interfaces to allow equally quick solidification of the heated and fused material by the absorption of heat by the adjacent structure. This quick cooling of the fused structure which follows immediately upon its rapid heating and fusion is important in producing the desired weld with so little material being heated to high temperatures.

The electron beam which heats the workpieces or parts to fusion temperature is focused to limit to a very small area the transverse size of the welding zone in which the material is directly heated by the electron beam. The electron beam is not only capable of effecting extremely rapid heating to fusion temperature of the material in the welding zone which is of very small size in transverse section, but it is at the same time capable of penetrating confronting portions of the workpieces to a great depth to produce, if desired, a very deep weld between the parts, which weld can be extended to any desired length along the abutting interfaces of the workpieces. Thus, beam welders can produce very deep and very extensive beam welds with relatively small quantities of heat and with no heat distortion of the parts, while at the same time producing complete fusion of the parts across confronting interfaces of great width and length. As previously intimated, the welding zone within which the desired rapid heating and fusion takes place must move at a rather fast pace along the confronting interfaces to be fused by welding. This is accomplished in practice so that very extensive welds are produced in a matter of only a few seconds.

However, it is not at all difficult in the same few seconds to produce, instead of the good weld desired, a faulty weld or even spoilage of the parts, which can be quite expensive.

In beam welding, precise control of the welding operation has been essential to the production of good welds. Faulty welds arise from a wide variety of variables. Good welds will not be produced if there is too much or too little heating of the parts, or if the movement of the welding beam along the workpieces is too fast or too slow. Difficulties also arise from improper focusing of the welding beam onto the workpieces.

Previously, it has been most difficult to determine the operating conditions required to produce good welds between workpieces of a specific shape, size and character. The depth of focus of the welding beam has been quite limited, thus complicating the problem of maintaining the beam focused on the workpieces as the welding zone progresses along the workpieces. Also, there has been considerable uncertainty concerning the intensity of the welding beam, with the result that the heating intensity of the beam was difficult to determine with exactness and dependability. In particular, the heating intensity of the beam has been subject to variation in effect by changes in the direction of movement of the workpieces in relation to the welding beam. The width of the welding beam and the welding bead formed by the beam has been different for different directions of movement of the parts in relation to the beam, and this has led to problems, not only in predetermining the welding effectiveness of the beam, but also in producing uniform welds along curving interfaces between parts.

Because of uncertain variables such as those referred to, the effort required to properly set up a conventional welding machine to produce each different weld has been great, and has normally required the services of a highly trained and skilled person. In fact, it has oftentimes been necessary to resort to experimentation in the production of a number of test welds to determine the conditions required for producing a desired weld on workpieces to be used. The delays and cost incident to the effort required for determining the conditions for performing a welding operation, which may take place within a very few seconds, have magnified the cost of beam welding.

Problems and difficulties of this character which have attended the use of conventional beam welding machines have been overcome by the present invention which involves an identification and rectification of the causes of the problems in a highly practical manner which greatly enhances the practical utility and advantages of beam welding.

Having reference to the exemplary embodiment of the invention illustrated, the welding beam producing assembly 38, FIGS. 2, 3, 4 and 11, comprises an electron emitter or cathode 80 fitted into a central aperture 82 in a toroidal electrostatic field shaping member 84. As will be described, the emitter or cathode 80 is directly heated by a flow of cathode heating current through the emitter, so that the emitter emits electrons that form the previously mentioned welding beam 62 of electrons that is directed toward the workpieces 34, 36.

The electrons emitted by the emitter 80 are accelerated to a high velocity in the direction of the workpieces to be welded by means of a centrally apertured anode 86 that is charged to a very high positive voltage or potential in relation to the voltage or potential applied to the emitter or cathode 80.

The very high electron accelerating voltage is applied between the anode 86 on one hand, and the emitter 80 and the field shaping member 84 on the other hand, by high voltage, direct current power supply means 88, illustrated diagrammatically in FIG. 4, and incorporated into the machine 30 shown in FIG. 1. Preferably, the anode 86 is maintained at ground potential, or nearly so, and a negative bias of the order of 30,000 volts is applied to both the field shaping member 84 and the emitter 80. Direct current power supply means suitable for this purpose is well known in the art and need not be described in detail here.

The side of the field shaping element 84 facing toward the anode 86 has a curved and generally concave shape, as illustrated in FIG. 11, which cooperates with the anode 86 in directing electrons from the emitter 80 through the central aperture 90 in the anode 86. The side of the anode 86 confronting the field shaping element 84 has a curved shape rising toward the emitter 80 in a radially inward direction, as shown in FIG. 3. The dimensions, shaping and spacing of the field shaping element 84 and the anode 86 in relation to each other, to direct the electrons through the aperture 90, as recited, is determined by conventional design principles well known and used in this art and requiring no description here.

The stream 62 of electrons passing through the central anode aperture 90 moves through the center of electron beam focusing coils 94 mounted in spaced relation to the anode 86 in coaxial alignment with the anode aperture 90 and the emitter 80, as shown in FIG. 3. The focusing coils 94 are energized by focusing coil power supply circuitry 96 illustrated diagrammatically in FIG. 4 and incorporated into the machine 30, FIG. 1. The power supply means 96 for the focusing coils 94 is similar to that used in conventional beam welding machines, and need not be specifically described here.

The electrical components just described of the assembly 38 are interconnected together with suitable support structure, indicated generally by the number 98, FIGS. 2, 3 and 4, which is movably suspended in the welding chamber 32 by the movable support means 70, previously referred to.

Electrons emitted by the emitter 80 and accelerated by the anode 86 pass through the anode aperture 90 at extremely high speed in a stream which passes on through the focusing coils 94 that focus the stream of electrons onto a very small impact or target area 100, FIG. 10, on the workpieces to be welded. This target area 100 immediately overlies the welding zone 74, previously mentioned, in the workpieces wherein the material is to be heated momentarily to fusion temperature. Thus, the welding beam 62 reaching to the target 100, FIG. 10, from the emitter 80, FIGS. 3 and 11, from which the beam originates occupies a well defined space 101, FIG. 3, embraced by the focusing coils 94 and extending through the central aperture 90 in the anode 86 as described. With reference to formation of the welding beam 62 which extends through the beam space or path 101 from the emitter 80 to the target 100, it will be appreciated that the described function of the field shaping element 84 in directing through the anode aperture 90 a concentrated stream of electrons which initially swarm from the emitter 80 constitutes, in fact, a focusing action. Thus, the field shaping element 84, like the coils 94, functions to focus electrons into the beam 62 and, like the coils 94, constitutes electron beam focusing means.

Location of the target area 100, FIG. 10, on typical workpieces so that it is bisected by the abutting interfaces 64, 66 on the workpieces is effected by making a number of adjustments, including movement as necessary of the work holder 60, and movement as a unit of the beam producing assembly 38 to bring the target area 100 into the desired location. The workpieces are positioned in relation to the electron beam 62 so that the portions of the interfaces 64, 66 in the welding zone 74 underlying the target area are substantially parallel to the axis of the welding beam.

Many advantages are obtained by directly heating the emitter 80 to electron emitting temperature by passing through the emitter heating current. A number of additional advantages are gained by using alternating electric current to directly heat the emitter.

As illustrated diagrammatically in FIG. 4, alternating emitter heating current is supplied from alternating current supply means 102 connected to the emitter 80 through a transformer or inductive coupling 104 forming a part of the current supply means 102. The output coil 106 of the coupling 104 is connected through two conductors 108, 110 with the emitter 80, as will be described, the coupling 104 serving to isolate the alternating current power supply means 102 from the very high potential applied to the emitter by the power supply means 88.

As shown in FIGS. 3 and 11, the two conductors 108, 110 are connected with the opposite end portions 112, 114 of a conductor 116, FIG. 12, having a central portion which forms the previously mentioned emitter 80. The conductor 116 is formed of tantalum or tungsten. The central portion of the conductor 116, which forms the emitter 80, has a width which is much less than the width of the two ends 112, 114 of the conductor, so that the flow of current through the conductor between its two ends causes the medial portion of the conductor to be heated to an electron emitting temperature while the two ends of the conductor remain relatively cool.

Heating of the emitter portion 80 of the conductor, which is substantially square, as viewed from the anode 86, is aided by the shaping of adjacent portions of the conductor which are, as shown in FIGS. 11 and 12, turned at right angles to the emitter 80 and away from the anode 86 and then folded toward each other as shown, so that radiant heat from portions of the conductor 86 adjacent the emitter 80 aids in heating the emitter 80 to electron emitting temperature. The shaping of the emitter forming conductor 116, as shown in FIGS. 11 and 12, is similar to that of emitter forming conductors used in conventional beam welding machines. For convenience in description, the two end portions 112, 114, through which emitter heating power is supplied to the medial portion of the conductor 116, will be referred to as power supply legs or conductors connected with the emitter.

It has been determined that many of the problems and difficulties previously associated with the use of conventional beam welding machines can be effectively eliminated by eliminating from the space through which the welding stream or beam of electrons passes magnetic fields previously produced as an incident to heating of the emitter to electron emitting temperature and previously disturbing the flow stream of electrons from the emitter into the welding beam of electrons.

The flow of emitter heating current through the conductor 116, forming the emitter 80, produces around the conductor 116 a magnetomotive force that tends to induce in the flow path of welding electrons a magnetic field that previously has produced a deleterious deflection of the welding beam 62 of electrons. Moreover, when the emitter 80 has been heated by alternating current, to realize the advantages stemming from this mode of heating the emitter, the deflection of the welding beam 62 by the magnetomotive force incident to the alternating emitter heating current has been a dynamic deflection that has compounded the difficulties arising from deflection of the welding beam by the emitter heating current.

FIGURES 7 and 9 represent efforts to depict graphically some of the effects of dynamic deflection of welding beams in conventional beam welding machines wherein the emitters are heated by alternating current. FIGURE 7 shows a plan view of four workpieces 120, 122, 124, 126 welded together by four welds 128, 130, 132, 134, produced in a conventional beam welding machine and extending in four different directions, as shown. The welds are stopped short of the edges of the workpieces in FIG. 7 for clearness in illustration.

It should be noted, with reference to FIG. 7, that the width of the several welds 128, 130, 132 and 134 is different for welds extending in different directions, the weld 134, for example, being much narrower than the weld 132 extending approximately at right angles to the weld 134. The illustration of welds in FIGURE 7 correctly illustrates the results which are obtained by using a conventional beam welding machine of the character recited. The differences in the width of the welds produced by a conventional beam welding machine, as illustrated in FIG. 7, stems from the fact that the direction of motion of the assembled workpieces in relation to the weld beam is different for the welds which extend in different directions in relation to each other.

The variation in the width of the welds 128, 130, 132 and 134 produced by a conventional welding machine, and illustrated in FIG. 7, is only the most apparent manifestation of problems ensuing from the deflection of the welding beam in conventional beam welding machines. The fact that the width of the weld varies with changes in the direction of relative motion of the workpieces and the welding beam not only results in an excessive volume of structural material of the workpieces being heated to welding temperature, with excessive scarring of the surfaces of the workpieces and excessive heating of the workpieces, but the same phenomena produce variation and an element of troublesome unpredictability in the intensity of the welding beam as applied to the workpieces. To produce high quality welds, it has been necessary to adjust the speed of movement of the workpieces in relation to the welding beam and to make other adjustments to compensate for such variations in the effective heating intensity of the welding beam. The problem of compensation for variation of the width in the weld becomes most complex in the production of curving welds.

Dynamic deflection of the welding beam 136, which has previously attended the operation of beam welding machines having emitters heated directly by alternating current, is illustrated graphically in FIG. 9 which shows the dynamic excursion 138 of the welding beam 136 along the abutting edges of the workpieces 140, 142 being welded. This dynamic excursion 138 of the welding beam increases the target area of the workpieces under active bombardment by the welding beam, and consequently increases the volume of the material in the underlying welding zone 144, FIG. 9. The result can be heating to fusion temperature of a larger volume of the structural material of the workpieces than is desirable, and an excessive widening of the scar or bead 146 produced by the welding action.

Looking at both FIG. 7 and FIG. 9, it will be seen that the width of the workpiece zone that is directly bombarded and heated by the electron beam varies with changes in the direction of relative movement of the workpieces and electron beam in relation to the transverse direction relative to the electron beam in which dynamic deflection of the electron beam is most pronounced. With reference to FIG. 7, the relatively narrow weld 134 results from movement of the workpieces and the welding beam relative to each other in a direction generally parallel to the direction of major dynamic deflection of the welding beam. The considerably wider weld 132 results from relative movement of the workpieces and welding beam in a direction generally perpendicular to the transverse direction of maximum dynamic deflection of the welding beam.

Interrelated with the deflection of the welding beam just referred to is a marked limitation on the depth of focus of the welding beam adjacent the target surface on the workpieces. The very limited depth of focus of welding beams have been characteristic of conventional welding machines, and have created difficulties for the operator in focusing the welding beam on the target surfaces. At best, the focus has been poor. Limitations on the depth of focus have caused a whole family of problems in welding workpieces of changing contour that create problems in maintaining a constant spacing on the workpieces from the electron producing assembly as welding progresses.

In applicant's improved beam welding machine, the depth of focus of the welding beam 62 adjacent the workpieces is markedly extended, and deflection of the welding beam as an incident to heating of the emitter is effectively eliminated, with the concomitant elimination of problems and difficulties previously stemming from this source.

FIGURE 8 shows a plan view of workpieces 150, 152, 154, 156, similar to the workpieces 120, 122, 124 and 126, but secured together by welds 158, 160, 162, 164 produced by the improved welding machine 30. It is particularly noteworthy that the width of all the welds 158, 160, 162 and 164 is the same, even though the welds extend in different directions and are produced by different directions of movement of the workpieces in relation to the welding beam 62.

FIGURE 10 illustrates graphically the steady, undeflected position of the welding beam 62 produced by the machine 30 and directed against a substantially circular target area 100 on the workpieces 34, 36. Since the welding beam 62 occupies a steady position undeflected by the current used to heat the emitter 80, as will presently appear, the target area 100 of the workpieces in the path of the welding beam is minimized, and the volume of the welding zone 74 underlying the target area is minimized to produce most efficient and intense heating of the material of the workpieces immediately adjacent the interfaces to be fused. Not only is the transverse width of the weld minimized to an optimum value, but it is made the same for all directions of movement of the workpieces in relation to the position of the welding beam, the shape of the target area 100 against which the welding beam is directed being substantially concentric with the center of the target area. Moreover, the undeflected beam has in the vicinity of the workpieces a markedly increased effective depth of focus which makes the spacing of the workpieces from the electron beam producing assembly 38 less critical, and serves to advantage in facilitating welding of workpieces of complex contour.

In the beam welding machine 30, deflection of the welding beam 62 is avoided by routing magnetomotive forces, incident to the flow of emitter heating current through the conductor 116 through magnetic circuit paths provided in a manner such that the magnetomotive force incident to flow of emitter heating current does not provide any significant electron beam deflecting field in the space through which electrons pass from the emitter 80 into the electron beam 62.

As best illustrated in FIGS. 3, 11 and 12, the magnetomotive force incident to the flow of emitter heating current through the conductor 116 is captured and routed or channeled harmlessly through magnetic circuits located outside of the space through which the electron beam passes, thus avoiding subjection of the electron beam to a beam deflecting field which would otherwise be produced by the magnetomotive force incident to the flow of emitter heating current through the conductor 116. For this purpose, each of the two electrical input ends or legs 112, 114 on the conductor 116 through which the heating current flows to the emitter 80 are closely encircled by two bands or rings 170, 172 fashioned from magnetic material of high magnetic permeability and preferably laminated as shown in FIGS. 11 and 12. The two magnetic rings 170, 172 are disposed in encircling relation to the respective input legs 112, 114 between the power conductors 108, 110 and the emitter 80 and are, in the construction shown, attached to the respective conductors 108, 110. To prevent magnetic saturation of the rings 170, 172, the continuity of each ring is nearly interrupted, as shown in FIG. 12, by a deep but narrow slot 177.

The two magnetic rings 170, 172, capture much of the magnetomotive force incident to the flow of emitter heating current through the conductor 116, thus preventing this magnetomotive force from producing a magnetic field in the space through which electrons pass from the emitter 80 into the electron beam. The magnetic rings 170, 172 are located, as shown, in positions removed from the space through which the electrons pass to form the desired beam, the magnetic flux or field produced in the magnetic circuits formed by the rings 170, 172, having no deleterious effect, because of the remote location of the rings 170, 172 in relation to the space through which electrons pass to form the beam.

The avoidance of magnetic deflection of the electron beam as an incident to heating of the emitter 80 is also achieved by providing a magnetic circuit path in closely encircling relation to the emitter 80 itself to capture the magnetomotive force incident to the flow of heating current through the emitter 80 and the immediately adjacent structure of the conductor 116.

As shown in FIGS. 3, 11 and 12, this magnetic circuit path is provided adjacent the emitter 80, but outside the space through which electrons move from the emitter into the electron beam, by means of a centrally apertured disk 176, formed of a magnetic material having a high magnetic permeability. As shown in FIG. 11, the magnetic disk 176 is supported on the field shaping element 84 in encircling relation to the central aperture 82 in the field shaping element which accommodates the emitter 80. The disk 176 rests directly on a surface 178 formed on the side of the field shaping element 84 opposite from the anode 86.

The objective here is to place the magnetic circuit, formed in this instance by the magnetic disk in closely adjacent, encircling relation to the position of the emitter 80, so that the magnetomotive force produced as an incident to the flow of heating current through the emitter is captured by the magnetic circuit and kept from forming a beam deflecting field in the space through which electrons pass into the beam 62.

A modification of the machine 30 designed to obviate deflection of the welding beam 62 as an incident to heating of the electron emitter is illustrated by the structure shown in FIGS. 14 and 15, wherein components similar to those previously described are identified with the same reference numbers, with the addition of the suffix a. The emitter 80a, shown in the modified construction of FIGS. 14 and 15, is incorporated into the machine 30 in the same manner as the emitter 80, previously described. The emitter 80a is fed with heating current in a manner such that the magnetomotive force incident to the conduction of heating current to and through the emitter 80a is self neutralizing, and does not produce a magnetic field which would disturb or deflect the electron beam issuing from the emitter 80a.

As shown in FIG. 15, the emitter 80a is fed with emitter heating current, not only at its opposite sides through input conductor legs 112a, 114a, but also at its center through a central input conductor 180 joining the backside of the emitter 80a at its center and extending away from the emitter between the two side conductor portions 112a, 114a. Manufacturing advantages are obtained by fashioning the conductor 116a in two halfsections 182, 184 formed as mirror images of each other and secured together back-to-back, as shown in FIG. 15, so that the central conductor 180 is formed by two parallel segments 186, 188 of the respective conductor sections 182, 184.

The conductor sections 182, 184 each forms one-half of the emitter 80a. The central input conductor 180 is connected to one side of the output coil 190 of the emitter heating power supply coupler 102a, and the other side of the output coil 190 is connected, as shown, to both input conductors 112a and 114a. Thus, current from the conductor 180 flows to the center of the emitter 80a where the current flow divides and flows from the center of the emitter in opposite directions through the emitter to the opposite sides of the emitter, where the current continues flowing through the two conductors 112a and 114a that are symmetrical with respect to a center line through the emitter 80a perpendicular to the effective electron emitting face of the emitter 80a. Because of the flow of current in opposite directions through the emitter 80a, and because of the flow of current through the input conductors 112a, 114a in a direction opposite to the flow of current through the input conductor 180, the magnetomotive force incident to the flow of heating current through the emitter 80a and the adjacent input conductors 180, 112a and 114a, is effectively neutralized, so that it does not form a magnetic field which will deflect the path of the stream of electrons issuing from the emitter 80a into the electron beam 62.

It will be understood that on alternate half cycles the flow of heating current through the conductor 116a is reversed, so that current flows in an opposite direction through both input conductors 112a, 114a, through the emitter 80a, and through the input conductor 180. However, the relative magnitude of the current flowing through the several conductors remains constant throughout the cycling action of the alternating current heating power flow, so that the electromotive force incident to this current flow remains continuously neutralized.

Another modified construction of the beam welding machine 30 is illustrated in FIGS. 16 and 17, wherein components similar to those shown in FIGS. 14 and 15 are identified by the same reference numbers, with the addition of the suffix b. The emitter forming conductor 116b, shown in FIGS. 16 and 17, is generally similar to the emitter forming conductor 116a, previously described in relation to FIGS. 14 and 15, except that the conductor 116b is modified to be circular in transverse section.

Thus, the emitter 80b is circular, as viewed from its anode side, FIG. 17. The central input conductor 180b connects with the center of the backside of the emitter 80b. The periphery of the emitter joins with a toroidal conductor 192 that extends away from the emitter 80b in encircling relation to the input conductor 180b. The emitter 80b is thinned in a radially outward direction from the conductor 180b and the emitter 80b and the adjacent portions of the conductors 180b and 192 are otherwise shaped to provide along the heating current circut path therethrough a uniform electrical resistance that provides for uniform heating of the emitter 80b as an incident to the flow of heating current through the emitter 80b, between the central input conductor 180b and the peripheral input conductor 192. The two input conductors 180b and 192 are connected to the output side of the power supply coupler 102b.

Current supplied to the center of the emitter 80b by the conductor 180b diverges radially, to flow in all radial directions to the peripheral input conductor 192. Because of this and the fact that the flow of current in the conductor 192 is opposite to that in the central conductor 180a, the magnetomotive force incident to the flow of emitter heating current is effectively neutralized, to the end that it does not produce a field that will deflect the beam of electrons 62. On alternate half cycles, the flow of current is reversed through the conductor 116b. However, the symmetry and balance of the current flow prevails to continue effective neutralization of the electromotive force from the current flow.

Another modification of the welding machine 30 is illustrated in FIGS. 18 and 19, wherein components similar to those previously described and are identified with the same reference numbers, with the addition of the suffix c. The emitter 80c formed by the conductor 116c is quite similar to the emitter 80 previously described. Heating current is supplied to the emitter 80c through two input conductors 112c, 114c, which join opposite sides of the emitter 80c and extend from the emitter in a direction away from the anode 86.

The input conductor 114c joins with the adjacent end of an electromotive force bucking or neutralizing conductor 194 located immediately alongside the conductor 116c, as shown in FIG. 19. As viewed on edge, the emitter forming conductor 116c and the electromotive force neutralizing conductor 194 are identical in shape, FIG. 18. The conductor 194 is located in closely adjacent relation to the conductor 116c, as shown in FIG. 19, but has a width, as viewed in FIG. 19, which somewhat exceeds that of the conductors 116c, so that the portion 196 of the conductor 194 corresponding to the emitter 80c of the conductor 116c is not heated to electron emitting temperature. Emitter heating current is supplied to the conductor 116c through the input conductor portion 112c and corresponding input conductor portion 198 of the conductor 194.

The ends of the emitter forming conductor 116c and the electromotive force neutralizing conductor 194 opposite from the input conductor portions 112c and 198 are joined by the previously mentioned conductor portion 114c, as shown in FIG. 19, so that even with alternating current flow used to heat the emitter 80c, the flow through the closely adjacent and similarly shaped conductors 116c and 194 is always in opposite directions, with the result that the electromotive force incident to the flow of emitter heating current through the conductor 116c is continuously neutralized effectively by the electromotive force incident to the flow of the same current in the opposite direction through the conductor 194, to the end that the electron beam 62 is not deflected by the flow of current used to directly heat the emitter 80c.

Another modification of the beam welding machine 30 is illustrated in FIG. 13, in which parts corresponding to those previously described are identified with the same reference numbers, with the addition of the suffix d.

As illustrated in FIG. 13, electron beam deflecting fields are kept out of the space through which the electron beam 62d moves from the emitter 80d, by heating the emitter 80d to electron emitting temperature by an intense application of energy from a source disposed in a remote position in relation to the emitter 80d, and having the capability to project effective emitter heating energy onto the emitter 80d without producing in the space through which the beam of electrons passes any beam deflecting magnetic field.

As shown in FIG. 13, the emitter 80d is formed by the bottom of a tungsten or tantalum cup 200, disposed in a central aperture 202 in the field deflecting member 84d, and resting on the edge of the member 84d encircling the opening 202. The bottom of the cup 200 forming the emitter 80d is heated to electron emitting temperature by an emitter heating beam 204 of electrons directed into the cup from a secondary or pilot emitter 206 located at the side of the emitter 80d opposite from the electron beam 62d, and having a very substantial spacing from the emitter 80d, such that the flow of emitter heating current through the emitter 206 does not form a magnetic field which will deflect the electron beam 62d because of the extensive spacing of the pilot 206 from the welding beam emitter 80d.

The pilot emitter 206 is heated by heating current supplied from an alternating current source 208 through a magnetic coupler 210. Direction of the emitter heating electrons from the pilot emitter 206 onto the welding beam emitter 80d is effected by a field shaping member 212 operating in conjunction with a protuberant shaping of the adjacent side of the field shaping member 84d, the other side of which aids in shaping the welding beam 62d. In this instance, the high voltage biasing circuit 88d is modified and connected to bias the pilot emitter 206 and the field shaping member 212 to an appropriate negative voltage in relation to the potential of the field shaping member 84d which, together with the cup 200 serve as an anode for the cathode emitter 206.

It will be appreciated that the invention is not necessarily limited to use of the particular structure specifically illustrated and described, but includes the use of modifications and alternatives within the spirit and scope of the invention as defined by the claims.

The invention is claimed as follows:

1. A beam welding machine comprising means defining a vacuum chamber and including an access door opening into said vacuum chamber for loading workpieces into the chamber, workpiece support means in said chamber, vacuum pump means connected to said vacuum chamber to evacuate said chamber, an electron emitter formed by the medial portion of a conductor disposed in said vacuum chamber and having two power supply conductor portions extending away from the emitter, said power supply conductor portions of said conductor each having a size in transverse section exceeding that of said emitter whereby the flow of an electric heating current through said emitter and both said power supply conductor portions elevates the emitter to a high electron emitting temperature while the power supply conductor portions of the conductor remain relatively cool; alternating current, emitter heating, power supply means including a coupler having an output side connected to said power supply conductor portions of said conductor to transmit alternating current through said conductor to heat said emitter while at the same time isolating said alternating current power supply means, except for said output side of said coupler, from the electric potential of said conductor; two magnetic flux short circuiting elements formed of a material having a high magnetic permeability and extending substantially around said respective power supply conductor portions of said conductor in proximity thereto to form magnetic circuits through which are channeled magnetomotive forces incident to the flow of alternating, emitter heating current through said respective power supply conductor portions; a centrally apertured magnetic flux short circuiting disk formed of a material having a high magnetic permeability and disposed in proximate, generally encircling relation to said emitter to form a magnetic circuit through which is channeled magnetomotive force incident to the flow of alternating, heating current through said emitter and adjacent portions of said conductor; a centrally apertured anode disposed in said vacuum chamber and located in spaced relation to said emitter to draw electrons from the emitter toward the anode, centrally apertured electrostatic field shaping means disposed adjacent said emitter on the anode side of said flux short circuiting disk, high voltage power supply means connected between said anode and said emitter and said field shaping means to apply to said emitter and said field shaping means a high voltage negative bias in relation to said anode for accelerating and directing through said anode electrons emitted by said emitter, an electronic beam focusing coil supported in said vacuum chamber in alined relation to said anode and located on the side thereof opposite from said emitter; focusing power supply means coacting with said focusing coil to supply an electronic beam focusing current to said coil to focus a stream of electrons, passing through the anode from said emitter, into a thin welding beam of electrons directed toward workpiece positions on said workpiece support means; said emitter, field shaping means, anode and focusing coil being mounted together in an assembly; and actuating means for producing relative movement of said assembly and said workpiece support means in said vacuum chamber for forming a beam weld progressively.

2. A beam welding machine comprising means defining a vacuum chamber and including means providing for the admission of workpieces into said chamber for welding, workpiece support means in said chamber, vacuum pump means connected to said vacuum chamber to evacuate said chamber, an electron emitter formed by the medial portion of a conductor disposed in said vacuum chamber and having two power supply conductor portions extending away from the emitter; alternating current power supply means connected to said power supply conductor portions of said conductor to transmit alternating, heating current through said conductor portions and said emitter to heat said emitter; two magnetic flux short circuiting elements formed of a magnetic material and extending substantially around said respective power conductor portions of said conductor in proximity thereto near said emitter to form magnetic circuits through which magnetomotive forces, incident to the flow of emitter heating current through said respective power conductor portions, are channeled so as to avoid magnetic deflection of the paths of electrons moving away from said emitter; a third magnetic flux short circuiting element formed of a magnetic material and disposed in proximate, substantially encircling relation to the position of said emitter to form a magnetic circuit through which is channeled magnetomotive force incident to the flow of heating current through said emitter and adjacent portions of said conductor; an anode disposed in said vacuum chamber in spaced relation to said emitter to draw electrons from the emitter in the direction of the anode, field shaping means disposed in said vacuum chamber adjacent said emitter, high voltage power supply means connected between said anode and said emitter and said field shaping means to apply to said emitter and said field shaping means a high voltage negative bias in relation to said anode for accelerating and directing past said anode a flow of electrons emitted by said emitter, an electronic beam focusing coil supported in said vacuum chamber in alined relation to said anode and located on the downstream side thereof with respect to the flow of electrons from said emitter past the anode; focusing power supply means coacting with said focusing coil to supply an electronic beam focusing current to said coil to focus a flow of electrons, passing the anode from said emitter, into a welding beam of electrons directed toward workpiece positions on said workpiece support means; said emitter, field shaping means, anode and focusing coil being mounted together in an assembly; and actuating means for producing relative movement of said assembly and said workpiece support means in said vacuum chamber.

3. A beam welding machine comprising means defining a vacuum chamber and including means providing access to said chamber for loading workpieces thereinto, workpiece support means in said chamber, vacuum pump means connected to said chamber to evacuate said chamber, a conductor forming an electron emitter disposed in said vacuum chamber, power supply means connected with said conductor to transmit heating current through said emitter, a centrally open anode disposed in said vacuum chamber in spaced relation to said emitter, high voltage power supply means connected between said anode and said emitter to apply to said emitter a high voltage negative bias in relation to said anode for causing electrons emitted by said emitter to be accelerated to high velocity in the direction of said anode, electron beam focusing means disposed in said vacuum chamber to focus electrons from said emitter into a welding beam disposed in a welding beam space extending from said emitter through said anode to workpiece positions on said workpiece support means, magnetomotive force collecting means fashioned from a material having a high magnetic permeability and being disposed in said vacuum chamber in proximate relation to said emitter, said magnetomotive force collecting means being located outside of said welding beam space and being shaped to form a magnetic circuit positioned outside of said beam welding space in closely encircling relation to said emitter to collect electromotive force produced as an incident to the flow of emitter heating current through said conductor and to keep the collected magnetomotive force from producing an electron beam deflecting field in said electron beam space; and means for producing in said vacuum chamber relative movement of said workpiece support means in relation to said focusing coil, said anode, and said emitter for causing progressive production of a beam weld.

4. A beam welding machine comprising means defining a vacuum chamber and including means providing for the admission of workpieces into said chamber for welding, workpiece support means in said chamber, vacuum pump means connected to said vacuum chamber to evacuate said chamber, an electron emitter formed by the medial portion of a conductor disposed in said vacuum chamber and having two power supply conductor portions extending away from the emitter; electron beam focusing means disposed in said vacuum chamber to focus a stream of electrons from said emitter into a welding beam continuing beyond the focusing means, an anode disposed in said vacuum chamber and spaced from said emitter, field shaping means disposed in said vacuum chamber adjacent said emitter; said emitter, field shaping means, anode and focusing means being aligned with each other to define a welding beam space for passage of electrons from the emitter in a welding beam extending past the anode and the focusing means; power supply means connected between said anode and said emitter and said field shaping means to apply to said emitter and said field shaping means a negative bias in relation to said anode for causing electrons to move from the emitter through said welding beam space at high speed; alternating current power supply means connected to said power supply conductor portions of said conductor to transmit alternating, heating current through said conductor portions and said emitter to heat said emitter; three magnetomotive force collecting elements formed of a magnetic material and extending, respectively, substantially around the emitter portion and the two power conductor portions of said conductor in proximity to said respective conductor portions but outside of said welding beam space to form magnetic circuits through which magnetomotive forces, incident to the flow of emitter heating current through said conductor, are channeled so as to keep the paths of electrons moving away from said emitter through said welding beam space from being deflected by any magnetic field produced by the magnetomotive forces collected by said collecting elements; said emitter, field shaping means, anode and focusing means being mounted together in an assembly; and actuating means for producing relative movement of said assembly and said workpiece support means in said vacuum chamber.

5. A beam welding machine comprising means defining a vacuum chamber and including means providing for the admission of workpieces into said chamber for welding, workpiece support means in said chamber, vacuum pump means connected to said vacuum chamber to evacuate said chamber, an electron emitter disposed in said vacuum chamber; electron accelerating means including an anode disposed in said vacuum chamber in spaced relation to said emitter to accelerate electrons from the emitter in the direction of the anode to move at high speed; electron beam focusing means disposed in said vacuum chamber to focus into a welding beam, disposed in a welding beam space extending from said emitter past and beyond said anode, electrons accelerated in said direction by means of said anode; emitter heating, electrical power supply means including two power input conductors connected with said emitter to transmit emitter heating current therethrough; three magnetomotive force diverting elements formed of a magnetic material and being disposed in said vacuum chamber and located outside of said welding beam space; said three magnetomotive force diverting elements extending, respectively, substantially around said emitter in proximity thereto and said power input conductors in proximity thereto near said emitter to form magnetic circuits through which magnetomotive forces, incident to the flow of emitter heating current, are channeled so as to avoid creation of any significant welding beam deflecting field in said welding beam space as an incident to the flow of emitter heating current; and actuating means for producing relative movement of said workpiece support means in said vacuum chamber in relation to said emitter and said anode.

6. A beam welding machine comprising means defining a vacuum chamber and including means providing for the admission of workpieces into said chamber for welding, workpiece support means in said chamber, vacuum pump means connected to said vacuum chamber to evacuate said chamber, an electron emitter disposed in said vacuum chamber; electron accelerating means including an anode disposed in said vacuum chamber in spaced relation to said emitter to accelerate electrons from the emitter in the direction of the anode to move at high speed; electron beam focusing means disposed in said vacuum chamber to focus into a thin high intensity welding beam, disposed in a welding beam space extending from said emitter past and beyond said anode, electrons accelerated in said direction by means of said anode; emitter heating, electrical means coacting with said emitter to transmit emitter heating current therethrough; magnetomotive force diverting means formed of a magnetic material and being disposed in said vacuum chamber and located outside of said welding beam space; said magnetomotive force diverting means extending substantially around said emitter in proximity thereto to form a magnetic circuit outside of said welding beam space through which magnetomotive forces, incident to the flow of heating current through said emitter, are channeled so as to avoid creation of any significant welding beam deflecting field in said welding beam space as an incident to the flow of heating current through said emitter; and actuating means for producing relative movement of said workpiece support means in said vacuum chamber in relation to said emitter and said anode.

7. A beam welding machine comprising means defining a vacuum chamber and including means providing for the admission of workpieces into said chamber for welding, workpiece support means in said chamber, vacuum pump means connected to said vacuum chamber to evacuate said chamber, an electron emitter disposed in said vacuum chamber; electron accelerating means including an anode disposed in said vacuum chamber in said relation to said emitter to accelerate electrons from the emitter in the direction of the anode to move at high speed; electron beam focusing means disposed in said vacuum chamber to focus into a welding beam, occupying a welding beam space extending from said emitter past and beyond said anode, electrons accelerated in said direction by means of said anode; emitter heating, electrical power supply means connected with said emitter to transmit emitter heating current therethrough; magnetomotive force diverting means formed of a magnetic material of high magnetic permeability and being disposed outside of said welding beam space in generally coaxial relation to the emitter end of said welding beam space, said magnetomotive force diverting means being located in closely adjacent relation to said emitter to collect and divert from said welding beam space magnetomotive forces incident to the flow of electrical heating current through said emitter, and actuating means for producing relative movement of said workpiece support means in said vacuum chamber in relation to said emitter and said anode.

References Cited
UNITED STATES PATENTS

| | | | |
|---|---|---|---|
| 3,118,050 | 1/1964 | Hetherington | 219—121 |
| 3,172,007 | 3/1965 | Hanks et al. | 219—121 |
| 3,187,216 | 6/1965 | Sciaky | 219—121 |
| 3,322,930 | 5/1967 | Sciaky | 219—121 |

RICHARD M. WOOD, *Primary Examiner.*

W. D. BROOKS, *Assistant Examiner.*